United States Patent [19]

Stallsworth

[11] Patent Number: 4,854,604
[45] Date of Patent: Aug. 8, 1989

[54] SELF-CENTERING HITCH

[76] Inventor: Bradley E. Stallsworth, R.R. #2, Box 81, Mt. Carmel, Ill. 62863

[21] Appl. No.: 196,050

[22] Filed: May 19, 1988

[51] Int. Cl.$^4$ .............................................. B60D 1/00
[52] U.S. Cl. .................................. 280/477; 280/511; 340/425.5
[58] Field of Search .................... 280/477, 478 B, 511; 340/52 R, 393, 686

[56] References Cited

U.S. PATENT DOCUMENTS

| | | | |
|---|---|---|---|
| 827,431 | 7/1906 | Evensen | 280/477 |
| 2,703,243 | 3/1955 | Clark | 280/477 |
| 2,797,406 | 6/1957 | Tanis et al. | 280/477 |
| 2,820,649 | 1/1958 | Demarest | 280/477 |
| 2,845,281 | 7/1958 | Holder | 280/477 |
| 3,266,818 | 8/1966 | Hill | 280/477 |
| 3,891,237 | 6/1975 | Allen | 280/477 |
| 4,042,254 | 8/1977 | Allen | 280/477 |
| 4,417,748 | 11/1983 | Dortch | 280/477 |
| 4,466,632 | 8/1984 | DeVorak | 280/477 |
| 4,568,099 | 2/1986 | Celentino | 280/477 |

Primary Examiner—Charles A. Marmor
Assistant Examiner—Donn McGiehan
Attorney, Agent, or Firm—Leon Gilden

[57] ABSTRACT

A self-centering hitch is set forth for securement of a trailer to an associated tow vehicle. The self-centering hitch includes a conventionally orthogonally oriented ball formed with an arcuate concave centering plate oriented rearwardly and integrally to a support securing said ball. Said centering plate is formed of a convex orientation relative to said ball with a radius of curvature oriented medially of said ball aligned with the center of said ball. The center plate is further formed with a plurality of switches formed integrally to said plate and associated with alarm means for indication of a right or left positioning of a hitch to be secured to said ball to assist in securement of said hitch to said ball.

5 Claims, 4 Drawing Sheets

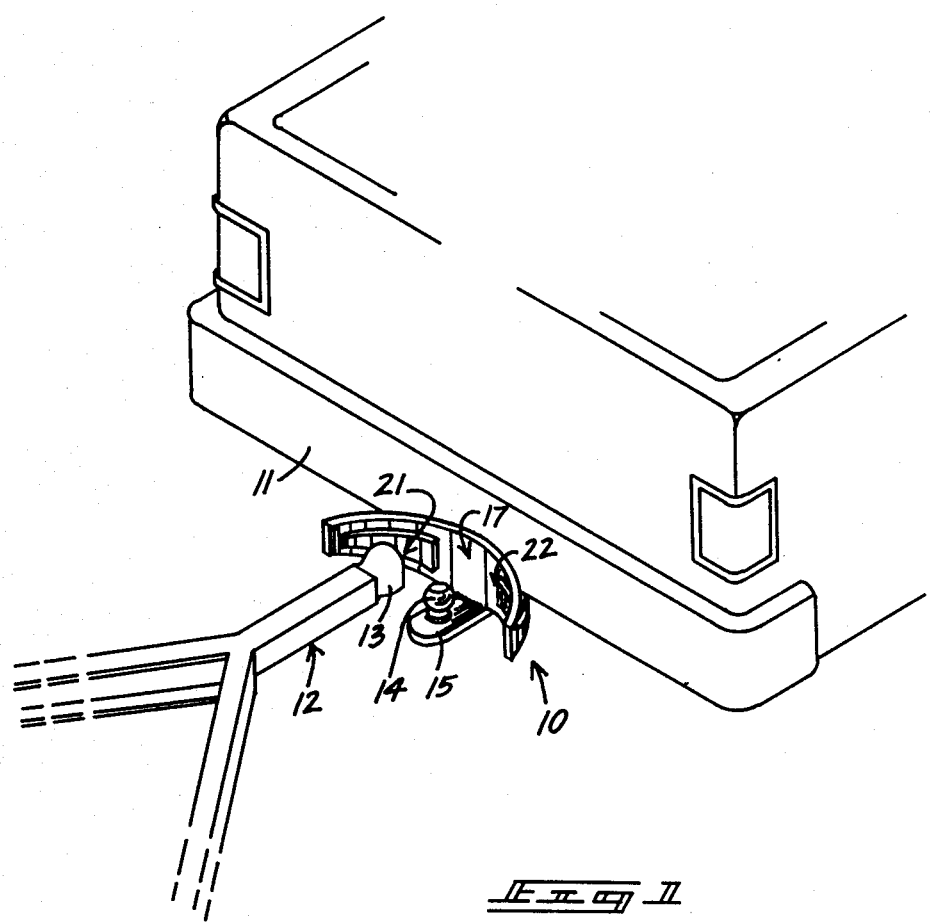

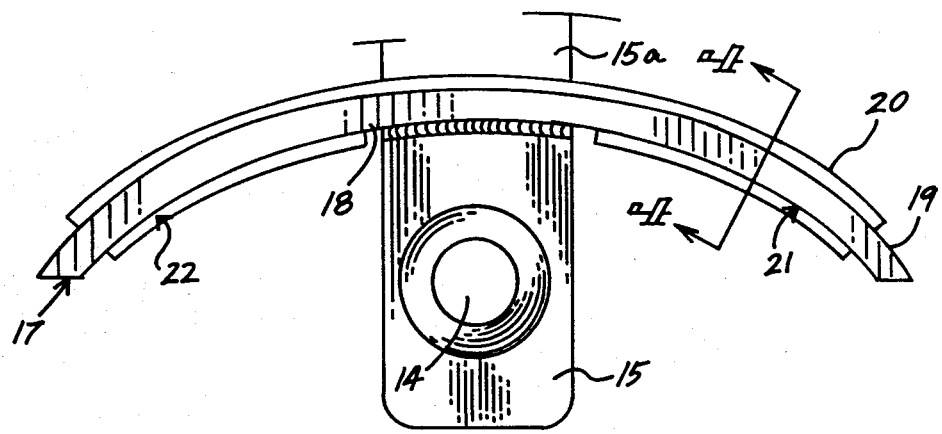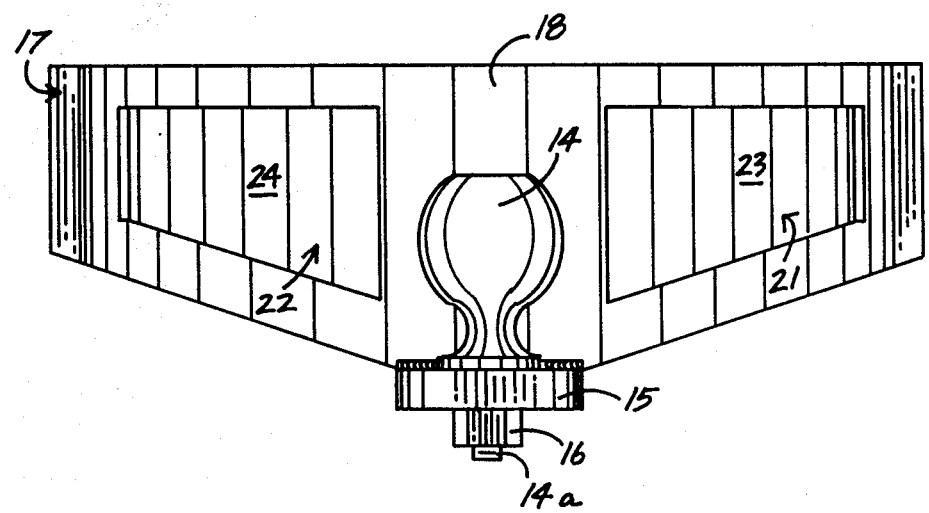

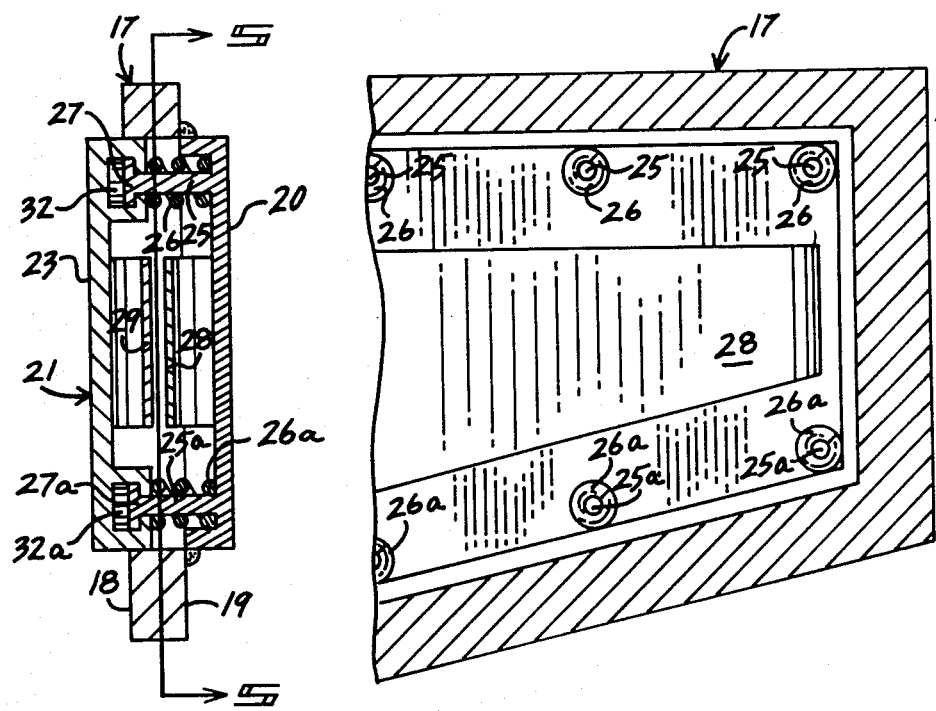
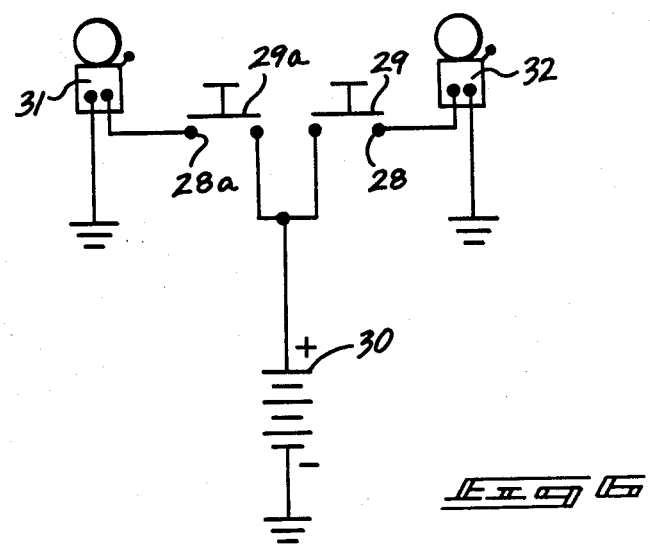
FIG. 4   FIG. 5
FIG. 6

SELF-CENTERING HITCH

BACKGROUND OF THE INVENTION

1. Field of the Invention

The field of invention relates to hitches and more particularly pertains to a new and improved self-centering hitch formed with an arcuate guide plate and with an alarm for assisting in securement of a trailer hitch to the associated self-centering hitch.

2. Description of the Prior Art

The use of self-centering hitches and the like of various types has been attempted in the prior art. The damage that is typical of failed joining procedures of a trailer hitch to a tow vehicle results in failed organizations to provide self-alignment hitches and the like. For example, U.S. Pat. No. 2,703,243 to Clark sets forth a relatively complex interrelated draft tongue aligner and coupler utilizing a draw bar with an eye attachable to a coupler of a towing vehicle by means of a plurality of cooperating links of a structure and organization relatively remote from that of the instant invention.

U.S. Pat. No. 2,820,649 to Demarest sets forth a coupler for a tractor and trailer vehicle including a bifurcated trailer hitch securable to a coupler of a trailer to permit a coupling of a tractor to a trailer vehicle at points within a range of relative position to the tractor to the trailer vehicle with a complex tongue release mechanism providing a structure of a complexity overcome by the instant invention.

U.S. Pat. No. 2,845,281 to Holder sets forth a hitching arrangement for coupling a tow vehicle to a trailing vehicle including a draft tongue longitudinally slidable rearwardly and laterally with a plate to align the plate with a coupling pin on a trailing device associated with the trailing vehicle whereupon coacting devices on the plate and the tongue enable coupling of the tongue laterally into alignment with a longitudinal center of the plate in response to a forward sliding of the tongue. The Holder patent, as other prior art, is relatively remote from that of the instant invention.

U.S. Pat. No. 3,266,818 to Hill sets forth a coupling device wherein an elongate draw bar slidably disposed within a compartment of a housing on a tow vehicle formed with a narrow end and an opposite enlarged circular end wherein the enlarged end is securable to a trailer vehicle whereupon the housing enables a degree of lateral movement of the trailer to the towing vehicle.

U.S. Pat. No. 3,891,237 to Allen sets forth an elongate member connectable to a towing vehicle with an axial socket coaxially arranged with a bell-shaped flange for guiding a shank associated with a ball joint to a tow vehicle to guidingly position the shank within the bell-shaped flange.

U.S. Pat. No. 4,042,254 to Allen sets forth an automobile hitch remotely securable to a trailer to be towed that is thereafter retractable within a socket secured to the towing vehicle.

U.S. Pat. No. 4,466,632 to DeVorak sets forth a trailering hitch wherein a crank securable to a towing vehicle powers a cable to reel in an attachment to a trailer connector to connect a trailer to the towing vehicle whereupon it may be appreciated that the complexity of such arrangements are remote from that set forth by the scope of the instant invention.

U.S. Pat. No. 4,568,099 to Celentino sets forth a hitch arrangement between a towing vehicle and a trailer wherein a rod extends from a first vehicle into a complementary grasping means on a second vehicle wherein the grasping means may be activated to secure the rod firmly to effect towing whereupon a flared arrangement assists in guiding the rod into a connection.

As such, it may be appreciated that there is a continuing need for a new and improved self-centering hitch that includes the aspects of ease of use, durability of construction and in this respect, the present invention substantially fulfills this need.

SUMMARY OF THE INVENTION

In view of the foregoing disadvantages inherent in the known types of self-centering hitches now present in the prior art, the present invention provides an self-centering hitch wherein the same enables compact securement to an associated tow vehicle with alarm means for indication of an off center orientation of a trailering vehicle relative to the hitch. As such, the general purpose of the present invention, which will be described subsequently in greater detail, is to provide a new and improved self-centering hitch which has all the advantages of the prior art self-centering hitches and none of the disadvantages.

To attain this, the present invention comprises a self-centering hitch formed with an elongate horizontal tongue orthogonally oriented relative to a tow vehicle with a towing ball oriented at a remote portion of said tongue with an arcuate deflecting guide of convex configuration relative to said ball with the medial center and radius of curvature of the guide directed through the axial center of said ball with integrally formed switches secured within said guide to either side of said ball electrically secured to remote signals to actuate a signal upon malpositioning of a trailering vehicle relative to said ball and striking said switch.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved self-centering hitch which has all the advantages of the prior art self-centering hitches and none of the disadvantages.

It is another object of the present invention to provide a new and improved self-centering hitch which may be easily and efficiently manufactured and marketed.

It is a further object of the present invention to provide a new and improved self-centering hitch which is of a durable and reliable construction.

An even further object of the present invention is to provide a new and improved self-centering hitch which is susceptible of a low cost of manufacture with regard to both materials and labor, and which accordingly is then susceptible of low prices of sale to the consuming public, thereby making such self-centering hitches economically available to the buying public.

Still yet another object of the present invention is to provide a new and improved self-centering hitch which provides in the apparatuses and methods of the prior art some of the advantages thereof, while simultaneously overcoming some of the disadvantages normally associated therewith.

Still another object of the present invention is to provide a new and improved self-centering hitch wherein the same is formed with an arcuate guide to assist in directing a trailering hitch onto a ball associated with the self-centering hitch and further including a signal alarm to either side of the ball to assist in positioning of the trailering hitch relative to the ball.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the self-centering hitch associated with a towing vehicle relative to a trailering hitch.

FIG. 2 is a top orthographic view of the instant invention.

FIG. 3 is a frontal orthographic view taken in elevation of the instant invention.

FIG. 4 is an orthographic view taken along the lines 4—4 of FIG. 2 in the direction indicated by the arrows.

FIG. 5 is an orthographic view taken along the lines 5—5 of FIG. 4 in the direction indicated by the arrows.

FIG. 6 is a diagrammatic illustration of the switches associated with a power source in the instant invention.

DESCRIPTION OF THE PREFERRED EMBODIMENT

Figure 7:
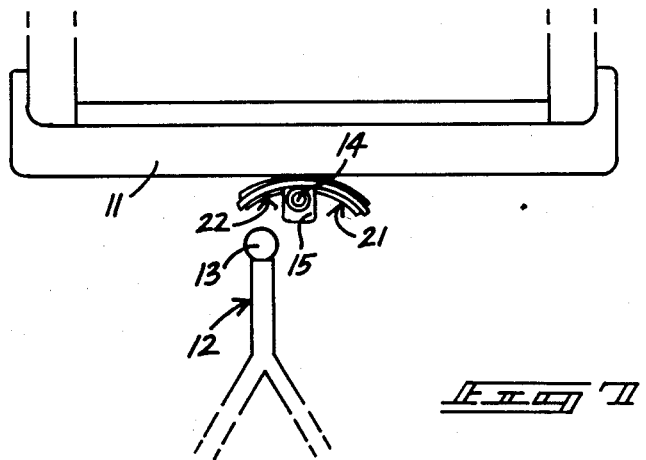
FIG. 7 is a top orthographic view of the instant invention associated with a trailering hitch in a first position.

With reference now to the drawings, and in particular to FIGS. 1 to 9 thereof, a new and improved self-centering hitch embodying the principles and concepts of the present invention and generally designated by the reference numeral 10 will be described.

More specifically, it will be noted that the self-centering hitch apparatus 10 essentially comprises the hitch 10 secured to an associated bumper of a towing vehicle, as illustrated in FIG. 1. A trailer boom 12 of conventional construction secured to a trailer to be towed is formed with a downwardly depending socket 13 of conventional construction to be associated with the hitching ball 14 orthogonally depending vertically from the horizontal tongue 15 of the hitch 10. The tongue 15 is formed with a rearwardly depending rear portion 15a extending rearwardly of the arcuate guide 17 of the instant invention. The rear portion 15a of the tongue 15 is secured to the towing vehicle by conventional means, such as welding, threaded fasteners, etc. of well known construction well within the purview of the instant invention. The hitching ball 14 is formed with a downwardly depending stud oriented through an opening (not shown) through the tongue 15 and attached to the tongue by a securement nut 16 about the downwardly extending stud 14a of the hitching ball 14.

Figure 9:
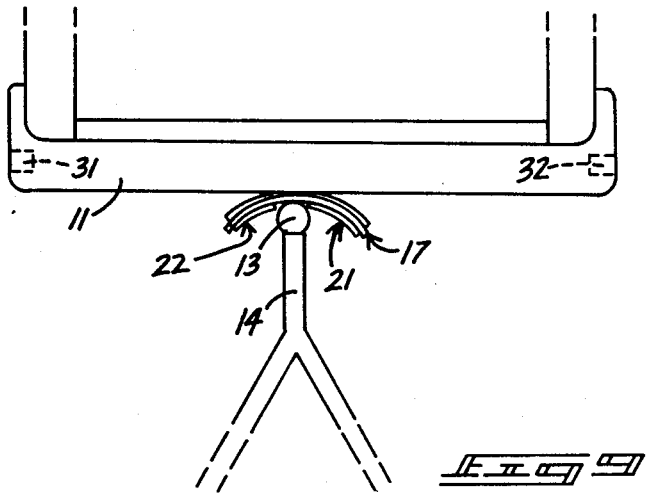
FIG. 9 is a top orthographic view of the self-centering hitch of the instant invention associated with the trailering hitch in a third and final position.

The arcuate guide 17 of the instant invention is formed with a radius of curvature and is positioned with its medial portion aligned with the axial center of the hitching ball 14 with its radius of curvature and medial line extending through the axial center of the hitching ball 14. The guide, as illustrated, is of a convex relationship rearwardly of the hitching ball 14 and is formed with a forward convex face 18 and a parallel rear face 19, as illustrated in FIG. 2 for example. A securement plate 20, as illustrated in FIG. 2, is formed to provide a rearward portion of the switches 21 and 22 of the instant invention. The switches 21 and 22 are provided to actuate indicator alarms diagrammatically illustrated in FIG. 6, as a left alarm 31 and a right alarm 32, that are secured to respective left and right sides of the vehicle in a typical location, as illustrated in FIG. 9 on the associated bumper 11. Alternatively, the alarms 31 and 32 could be positioned within the passenger compartment of the associated vehicle and may be audible alarms, as illustrated diagrammatically in FIG. 6, or visual alarms.

The right and left switches 21 and 22 respectively are positioned within right and left portions of the forward face 18 and are formed with a right pressure pad 23 and a left pressure pad 24 respectively, as illustrated in FIG. 3 for example.

Attention to FIG. 4 illustrate further details of the switches 21 and 22 with switch 21 illustrated for convenience where it is understood that switch 22 is merely a mirror counterpart of switch 21.

As illustrated, the switch 21 is formed with an exterior right pressure pad 23 secured to the rearwardly oriented securement plate 20 positioned rearwardly of the arcuate guide 17 and fixedly secured to the rear face 19 thereof. A series of upper and lower securement posts 25 and 25a, as illustrated in FIGS. 4 and 5, are rigidly secured and orthogonally directed outwardly of the securement plate 20 and are formed with respective "T" shaped heads 27 and 27a, as illustrated in FIG. 4. The "T" shaped needs are provided with limited reciprocating motion within upper and lower respective cavities 32 and 32a formed in the right pressure pad 23, as illustrated in FIG. 5. The pressure pad 23 has integrally secured thereto a right movable switch 29 to cooperate with a right stationary switch 28 formed to the securement plate 20. As illustrated in FIG. 6, the respective right and left for reciprocating motion to switches 29 and 29a cooperate with the stationary switches 28 and 28a respectively whereupon they are provided power from the towing vehicle such as the conventional twelve-volt wet cell 30 to actuate the respective right and left alarms 32 and 31, as illustrated.

Figure 8:
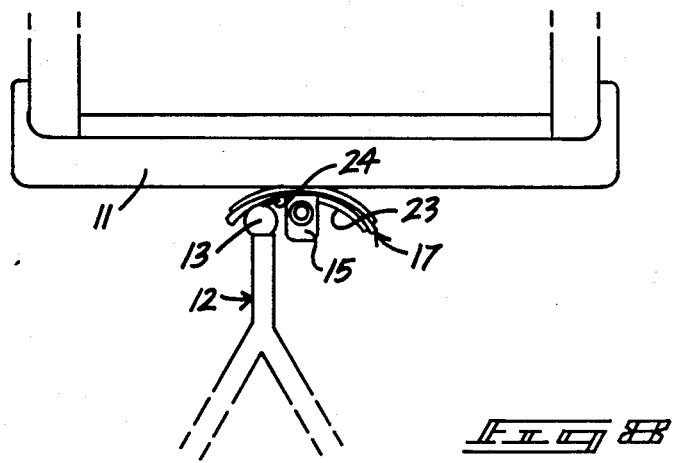
FIG. 8 is a top orthographic view of the self-centering hitch of the instant invention associated with the trailering hitch in a second position.

The sequence of FIGS. 7, 8, and 9 provide a typical event sequence whereupon the trailer boom is stationary and the towing vehicle and associated bumper 11 are rearwardly moved to engage the socket 13 with a hitching ball 14. FIG. 8 illustrates a typical event whereupon the socket ball 13 being misoriented relative to the hitching ball 14 strikes the left switch 22 thereby depressing the left pressure pad 24 whereupon the left stationary switch 28a engages the left movable switch 29a to complete the circuit and energize alarm 31. The arcuate guide in conjunction with the alarm alerts an operator as to the leftward orientation of the socket 13 whereupon maneuvering enables the socket 13 to be directed centrally of the guide 17 and into alignment with the hitching ball 14.

The manner of usage and operation of the instant invention should be apparent from the above description, and therefore no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A self-centering trailer hitch for use in combination with a towing vehicle for coupling a trailer to said towing vehicle comprising, a horizontal outwardly directed tongue rigidly secured to said towing vehicle including a hitching ball integrally secured orthogonally to said tongue, and a concave arcuate guide means for deflecting a trailer socket onto said hitching ball integrally secured to said tongue and extending upwardly of said tongue and extending horizontally of said tongue to form a right concave surface and a left concave surface, and said guide means further including an alarm means comprising a right and left alarm means secured through said right and left concave surface of said guide means for indicating a compression of said alarm means by impact with said trailer socket, and wherein said right and left alarm means each include an outwardly directed pressure pad directed outwardly of said guide means of a forward face oriented toward said hitching ball and including a securement plate secured to said guide means to a rear surface of said guide means between said towing vehicle and said guide means.

2. A self-centering hitch as set forth in claim 1 wherein said securement plate further includes a series of securement posts orthogonally and integrally secured to said securement plate each formed with a "T" shaped head reciprocatingly slidable within recesses formed in said pressure pad including biasing means to bias said pressure pad outwardly of said securement plate and of said forward face of said guide means.

3. A self-centering hitch as set forth in claim 2 wherein said pressure pad includes a movable switch for cooperation with a stationary switch integrally secured to said securement plate for contact of said stationary switch with said movable switch upon compression of said pressure pad.

4. A self-centering hitch as set forth in claim 3 wherein power for said alarm means is provided by said towing vehicle's storage battery.

5. A self-centering hitch as set forth in claim 4 wherein said alarm means is formed through said guide means and integrally secured thereto.

* * * * *